March 1, 1960

R. HEID 2,926,765

CLUTCH ARRANGEMENT

Filed May 28, 1957

INVENTOR
Roland Heid by: Michael S. Striker
agt.

March 1, 1960 R. HEID 2,926,765
CLUTCH ARRANGEMENT
Filed May 28, 1957 3 Sheets-Sheet 2

INVENTOR.
Roland Heid
BY Michael S. Striker

March 1, 1960

R. HEID 2,926,765

CLUTCH ARRANGEMENT

Filed May 28, 1957

INVENTOR
Roland Heid
by Michael S. Striker
Agt.

United States Patent Office 2,926,765
Patented Mar. 1, 1960

2,926,765
CLUTCH ARRANGEMENT

Roland Heid, Schweinfurt (Main), Germany

Application May 28, 1957, Serial No. 673,549

Claims priority, application Germany September 28, 1955

7 Claims. (Cl. 192—48)

The present invention relates to a clutch.

More particularly, the present invention relates to a clutch arrangement which is particularly adapted to be used in motor vehicles and this application is a continuation-in-part application of my copending application Serial No. 612,657, filed September 28, 1956, and now abandoned.

There exist clutch arrangements wherein a rotational speed responsive clutch is provided for establishing a driving connection between a drive shaft connected to the vehicle engine and a driven shaft connected to the driving wheels of the vehicle. The rotational speed responsive clutch is so constructed that it does not couple the shafts to each other unless the drive shaft rotates at a cerain minimum speed, so that when the drive shaft rotates below this speed no power or torque transmitting relationship between the shafts is established. As a result, the vehicle engine, which is usually of the internal combustion or other non-self-starting type cannot, in the event of failure of the starting mechanism, be cranked by coupling the driving shaft to the driven shaft and pushing the vehicle.

It has therefore been proposed to provide a clutch arrangement for use in a motor vehicle or the like, which clutch arrangement couples the driving and driven shafts to each other not only when the driving shaft rotates at at least a predetermined speed, but also when the driven shaft rotates, or tends to rotate, faster than the driving shaft. In this way, the engine may be cranked by pushing the vehicle, or by permitting it to roll. Furthermore, such a clutch arrangement makes it possible for the engine to be used as an auxiliary brake.

It has been found, however, that clutch arrangements such as this make it impossible to shift from a higher to a lower gear inasmuch as the driven shaft cannot rotate faster than the driving shaft.

It is, therefore, an object of the present invention to overcome this disadvantage by providing a clutch arrangement of the above-described type wherein the driving and driven shafts may be placed completely out of power and torque transmitting relationship irrespective of the absolute rotational speed of the driving shaft or the relative rotational speeds of both shafts.

It is another object of the present invention to provide a clutch arrangement which may be mass-produced economically, which is well-built, and which will give long periods of trouble-free service.

With the above objects in view, the present invention mainly resides in a clutch arrangement which is especially adapted to be used in a self-propelled vehicle. The clutch arrangement includes first and second rotatable shafts, and first and second clutch means interconnecting these shafts. The first clutch means includes rotational speed responsive clutch means for coupling the shafts to each other when the first shaft rotates at at least a predetermined speed and first disconnect means for disconnecting the shafts from each other irrespective of the rotational speed of the first shaft. The second clutch means include unidirectional clutch means for coupling the shafts to each other when they rotate in one direction with the second shaft rotating faster than the first shaft and second disconnect means for disconnecting the shafts from each other irrespective of the relative rotational speeds of the shafts. The clutch arrangement further includes operating means for operating the first and second disconnect means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
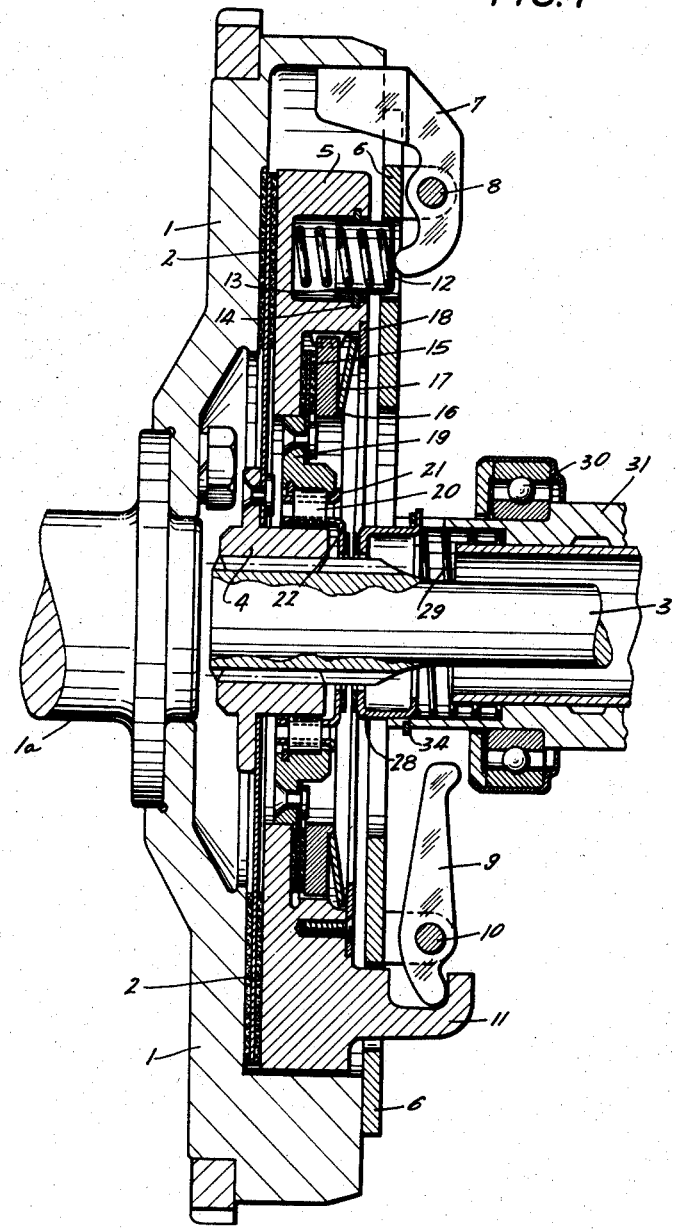
Fig. 1 is a sectional view of a preferred embodiment of the present invention.
Figure 2:
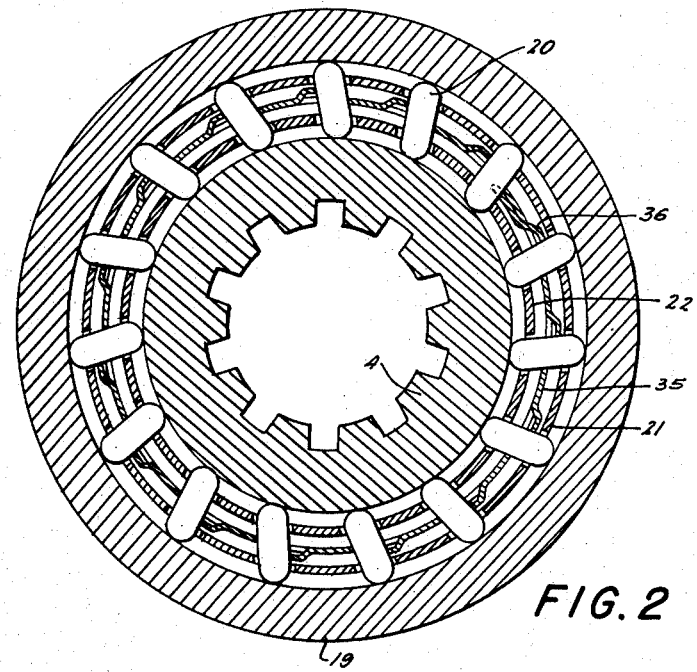
Fig. 2 is a sectional view on an enlarged scale of a unidirectional clutch incorporated in the embodiment shown in Fig. 1.

Referring now to the drawings, and to Figs. 1 and 2 thereof in particular, there is shown a preferred embodiment of a clutch arrangement according to the present invention which incorporates a rotational speed responsive clutch which is built into a flywheel 1 attached to a shaft 1a which may be the crank shaft of an internal combustion engine (not shown). Torque is transmitted between the shaft 1a and a driven shaft 3 by means of a clutch disc 2 carried by a sleeve 4 which is mounted on the shaft 3 and is axially displaceable relative thereto. The disc 2 is pressed between the flywheel 1 and a pressure plate 5, the flywheel 1 and the pressure plate 5 having suitable friction surfaces adapted to engage the opposite annular faces of the clutch disc 2.

A plurality of fly weights 7, one of which is shown in Fig. 1, are mounted on a cover plate 6 by means of hinges 8. Each of the fly weights 7 cooperates with a cup-shaped spring retaining element 13 and serves to compress a spring 12 when the flywheel 1, together with the pressure plate 5 and the cover 6, rotates at sufficiently high speed so that the fly weight 7 assumes the position illustrated in Fig. 1. In this way, the pressure plate 5 presses the disc 2 against the flywheel 1 with sufficient force to establish a driving or torque transmitting connection between the flywheel and the driven shaft 3.

Suitable disconnect means are provided for disengaging the centrifugal clutch irrespective of the rotational speed of the flywheel 1. For this purpose, a plurality of double-armed levers 9, one of which is shown in Fig. 1, are pivotally mounted on the cover 6 by means of hinges 10, for moving the pressure plate 5 rightwardly, as viewed in Fig. 1, against the action of the springs 12. In order to accomplish this, the lever 9 shown in Fig. 1 may be pivoted in counterclockwise direction upon leftward movement of the uncoupling bearing 30 which is carried by a bearing sleeve 31. The short arm of the lever 9 will then engage a nose 11 of the pressure plate 5, thereby causing deactivation of the centrifugal clutch.

Inasmuch as the above-described centrifugal clutch cannot be relied upon to establish a driving connection between the shafts 1a and 3 at such time as the engine is at a standstill, a locking device in the form of a uni-directional clutch is interposed between the shafts 1a and 3. In the embodiment illustrated in Fig. 1, this uni-directional clutch is arranged between the sleeve 4 and the pressure plate 5, but it will be understood that the clutch could, if desired, be arranged directly between the shafts 1a and 3 without the intermediary of any of the components of the centrifugal clutch.

Figure 2A:
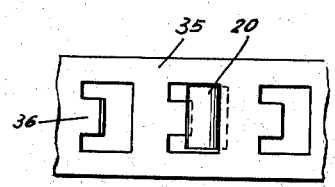
Fig. 2A is a fragmentary view of a portion of clutch shown in Fig. 2.

The uni-directional clutch is of the free-wheeling, overrunning type and includes a ring 19 and a plurality of wedge elements 20. The latter are arranged between outer and inner races constituted, respectively, by the inner surface of the ring 19 and the outer surface of the sleeve 4. The elements are connected to each other by rings 21 and 22 which interconnect the elements in such a manner that their position between the races is normally such that the wedge elements are wedged between the races when the shafts rotate in counter-clockwise direction with the sleeve 4 rotating or tending to rotate faster than the shaft 1a with which the ring 19 turns. For this purpose, suitable spring means interconnect the rings 21 and 22. These spring means may be in form of a spring band 35 formed with cutouts through which the elements 20 project. As may best be seen in Figs. 2 and 2A, a nose portion 36 projects into each recess and serves to maintain the respective elements 20 in engagement wtih the ring 19 and the sleeve 4.

The above-described uni-directional clutch may be de-activated by braking the ring 22, as, for example, by means of a brake ring 28 which engages the ring 22 upon leftward movement of the sleeve 31. The braking force acts against the spring 35, 36 and causes the wedge elements to assume an inoperative position wherein they deform the respective nose portions 36 and are not wedged between the races, irrespective of the relative rotational speeds of the shafts. The brake ring 28 is keyed in slots formed in the bearing sleeve 31 so that the ring 28 cannot rotate relative thereto, and a spring 29 is provided for continuously urging a flange of the ring 28 against an abutment 34 which may be in the form of a snap ring.

In Fig. 1 the ring 22 and the brake ring 28 are out of engagement with each other. However, when the bearing sleeve is moved leftwardly so as to disengage the centrifugal clutch, the brake ring 28 will engage the ring 22, thereby retarding the ring 22 and forcing the elements 20 out of the position shown in Fig. 2 against the force of the nose portions 36, thus disengaging the uni-directional clutch. In this way, the centrifugal and slip-friction clutches are disengaged substantially simultaneously. When the brake ring 28 frees the ring 22, the nose portion 36 will return the elements 20 to the position shown in Fig. 2.

If desired, suitable slip friction means may be operatively associated with the uni-directional clutch so as to make the same a slipping one. In this way, jarring or jolts are avoided upon re-engagement of the clutch.

The slip friction means include an annular clutch disc 15 which is connected to the ring 19. The clutch disc 15 is pressed against the pressure plate 5 by means of an annular pressure member 16 which is pressed leftwardly by an annular dished spring 17. The latter may be prestressed and is maintained under stress by a retaining ring 18 carried by the pressure plate 5. In this way, the maximum force capable of being transmitted between the shafts 1a and 3 by way of the uni-directional clutch is limited to the force which can be transmitted by the slip friction means.

Figure 4:
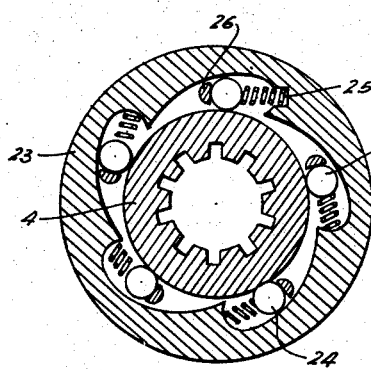
Fig. 4 is a sectional view of a uni-directional clutch incorporated in the embodiment shown in Fig. 3.
Figure 3:
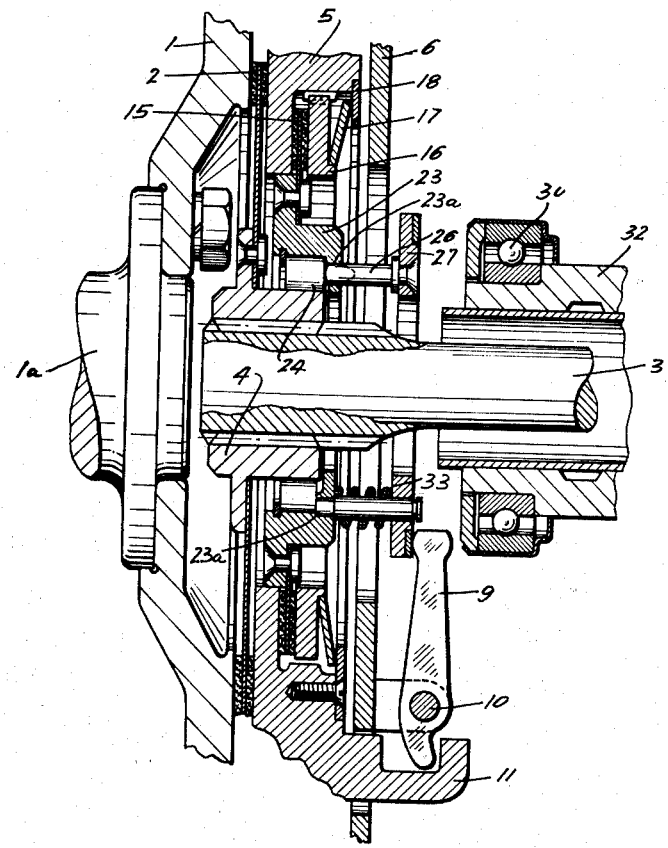
Fig. 3 is a sectional of another embodiment of the present invention.

The embodiment shown in Figs. 3 and 4 differs from the above-described embodiment in the construction of the uni-directional clutch. In the embodiment shown in Figs. 3 and 4 the uni-directional clutch is of the free-wheeling overrunning roller type and includes a ring 23, the configuration of which is shown in Fig. 4, which constitutes an outer race, the sleeve 4 constituting the inner race. The uni-directional clutch includes a plurality of rollers 24 which, by means of springs 25, are pressed between the inner and outer races so that the rollers are adapted to be wedged between the same when the shafts rotate in counter-clockwise direction with the shaft 3 rotating faster than the shaft 1a.

Each of the rollers 24 is adapted to be engaged by the tapered end portion of a pin 26 which extends through an aperture 23a of the ring 23. The pin 26 is attached to a ring 27 which is moved leftwardly when the bearing sleeve 32 is moved in the same direction, suitable springs 33, one of which is shown in Fig. 3, being provided for returning the ring 27 together with its pins 26 into the position shown in Fig. 3 when the bearing sleeve 32 is returned into its original position. It will be seen that when the rollers 24 are pressed against their respective springs 25, the rollers will be maintained out of wedging engagement between the inner and outer races, irrespective of the relative rotational speeds of the shafts.

It will be understood that each of the elements described above, or two or more together, may also find a useful application in other types of clutches differing from the types described above.

While the invention has been illustrated and described in a clutch arrangement particularly adapted to be used in a self-propelled vehicle, it is not intended to be limited to the details shown, since various modifications and structural changes may be made without departing in any way from the spirit of the present invention. For example, the rotational speed responsive clutch may be of any suitable construction other than that shown in the illustrated embodiments. Similarly, the uni-directional clutch may be constructed differently from the arrangements shown in the drawings, it being possible, for example, to construct the uni-directional clutch in the form of a ratchet mechanism.

It will also be understood that the uncoupling means for uncoupling the clutches may be of any suitable construction and may be operated in any desired manner. For example, the uncoupling means may be manually actuated, may be actuated by a foot-operated pedal, or may be actuated by a suitable pneumatic device which may be connected to the intake manifold of the engine. Additionally, any other suitable electrical, mechanical or hydraulic means may be provided.

Also, the present invention is not limited to an arrangement wherein the rotational speed responsive and the uni-directional clutch means are so constructed and arranged as to be capable of being de-activated, thereby rendering the respective clutches incapable of coupling the shafts to each other. Instead, structurally independent disconnect clutch means may be serially connected with the rotational speed responsive clutch or with the uni-directional clutch. That is to say, the two rotatable shafts may be connected by two clutch means, one of which includes the rotational speed responsive clutch and a structurally separate disconnect clutch in series therewith, and the other of which clutch means includes the uni-directional clutch and a structurally separate disconnect clutch in series therewith.

It is also within the scope of the present invention that a clutch arrangement of the type described herein be incorporated in a device in which the driving and driven shafts are, during normal operation, called upon to rotate in either direction, so that the present invention is not to be construed as being limited to an arrangement wherein the driving shaft is normally driven in but one direction only. Thus, the centrifugal clutch couples the shafts to each other when the driving shaft rotates at at least a predetermined speed, regardless of which direction the driving shaft is rotated, whereas the overrunning clutch will couple the driving and driven shafts to each other not only when the same rotate in one particular direction with the driven shaft rotating or tending to rotate faster than the driving shaft, but also when the shafts rotate in the opposite direction with the driving shaft rotating or tending to rotate faster than the driven shaft. However, when the clutch arrangement is incorporated in a motor vehicle or the like, the driving shaft is ordinarily driven in but one direction only, and for this reason the overrunning clutch shown herein is referred to as a uni-directional clutch.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A clutch arrangement comprising, in combination, first and second rotatable shafts; first clutch means interconnecting said shafts and including rotational speed responsive clutch means for coupling said shafts to each other when said first shaft rotates at at least a predetermined speed and first disconnect means for disconnecting said shafts from each other irrespective of the rotational speed of said first shaft; second clutch means interconnecting said shafts and including uni-directional clutch means for coupling said shafts to each other when they rotate in one direction with said second shaft rotating faster than said first shaft and second disconnect means for disconnecting said shafts from each other irrespective of the relative rotational speeds of said shafts; and common operating means for operating said first and second disconnect means.

2. In a self-propelled vehicle having an engine, a clutch arrangement comprising, in combination, a first rotatable shaft adapted to be connected to the engine in such a manner that the same, during normal operation, rotates said first shaft in one direction; a second rotatable shaft; first clutch means interconnecting said shafts and including rotational speed responsive clutch means for coupling said shafts to each other when said first shaft rotates at at least a predetermined speed and disconnect means for disconnecting said shafts from each other irrespective of the rotational speed of said first shaft; uni-directional second clutch means interconnecting said shafts for coupling the same to each other when they rotate in said one direction with said second shaft rotating faster than said first shaft, said uni-directional clutch means being so constructed and arranged as to be capable of being deactivated thereby rendering said uni-directional clutch means incapable of coupling said shafts to each other; and common operating means for operating said disconnect means and deactivating said uni-directional clutch means.

3. In a self-propelled vehicle having an engine, a clutch arrangement comprising, in combination, a first rotatable shaft adapted to be connected to the engine in such a manner that the same, during normal operation, rotates said first shaft in one direction; a second rotatable shaft; first clutch means interconnecting said shafts and including rotational speed responsive clutch means for coupling said shafts to each other when said first shaft rotates at at least a predetermined speed and disconnect clutch means for disconnecting said shafts from each other irrespective of the rotational speed of said first shaft; uni-directional second clutch means interconnecting said shafts for coupling the same to each other when they rotate in said one direction with said second shaft rotating faster than said first shaft, said uni-directional clutch means being so constructed and arranged as to be capable of being de-activated thereby rendering said uni-directional clutch means incapable of coupling said shafts to each other; and common operating means for simultaneously operating said disconnect clutch means and de-activating said uni-directional clutch means.

4. A clutch arrangement comprising, in combination, first and second rotatable shaft; rotational speed responsive clutch means interconnecting said shafts for coupling the same to each other when said first shaft rotates at at least a predetermined speed, said rotational speed responsive clutch means being so constructed and arranged as to be capable of being de-activated thereby rendering said rotational speed responsive clutch means incapable of coupling said shaft to each other; unidirectional free-wheeling overrunning roller clutch means interconnecting said shafts for coupling the same to each other when they rotate in one direction with said second shaft rotating faster than said first shaft, said unidirectional clutch means being so constructed and arranged as to be capable of being de-activated thereby rendering said uni-directional clutch means incapable of coupling said shafts to each other, said uni-directional free-wheeling overrunning roller clutch means including inner and outer roller races turnable with said shafts, respectively, and a plurality of rollers arranged between said races and adapted to be wedged between the same when said shafts rotate in said one direction with said second shaft rotating faster than said first shaft; and common operating means for de-activating both of said clutch means and including a plurality of engaging elements cooperating with said rollers, respectively, for maintaining the same out of engagement with said races, irrespective of the relative rotational speeds of said shafts, upon actuation of said operating means.

5. The combination defined in claim 4 wherein said uni-directional free-wheeling overrunning clutch means further includes a plurality of springs operatively associated with said rollers, respectively, for urging the same into wedging relationship between said races, and wherein said engaging elements, upon actuation of said operating means, press said rollers against the action of the respective springs.

6. A clutch arrangement comprising, in combination, first and second rotatable shafts; a rotational speed responsive clutch means interconnecting said shafts for coupling the same to each other when said first shaft rotates at at least a predetermined speed, said rotational speed responsive clutch means being so constructed and arranged as to be capable of being de-activated thereby rendering said rotational speed responsive clutch means incapable of coupling said shafts to each other; uni-directional free-wheeling overrunning friction clutch means interconnecting said shafts for coupling the same to each other when they rotate in one direction with said second shaft rotating faster than said first shaft, said uni-directional clutch means being so constructed and arranged as to be capable of being de-activated thereby rendering said uni-directional clutch means incapable of coupling said shafts to each other, said uni-directional free-wheeling overrunning roller friction clutch means including inner and outer races turnable with said shafts, respectively, a plurality of wedge elements arranged between said races, and connecting means interconnecting said wedge elements in such a manner that their position between said races is normally such that said wedge elements are wedged between said races when said shafts rotate in said one direction with said second shaft rotating faster than said first shaft; and common operating means for de-activating both of said clutch means and including actuating means cooperating with said connecting means for causing said wedge elements to assume an inoperative position wherein they are not wedged between said races irrespective of the relative rotational speeds of said shafts.

7. The combination defined in claim 6 wherein said connecting means include an annular element, and wherein said actuating means include braking means adapted to engage said annular element upon actuation of said operating means, said annular element being so constructed and arranged that when the same is braked, said wedge elements are maintained in their inoperative position.

(References on following page)

References Cited in the file of this patent

UNITED STATES PATENTS

| | | |
|---|---|---|
| 2,136,811 | Burtnett | Nov. 15, 1938 |
| 2,299,739 | Colucci | Oct. 27, 1942 |
| 2,682,942 | Thunstrom et al. | July 6, 1954 |
| 2,721,638 | Palm | Oct. 25, 1955 |
| 2,746,585 | Binder | May 22, 1956 |

FOREIGN PATENTS

| | | |
|---|---|---|
| 971,381 | France | July 12, 1950 |
| 999,175 | France | Oct. 3, 1951 |
| 1,073,574 | France | Mar. 24, 1954 |